US011975353B2

(12) United States Patent
Ayrle

(10) Patent No.: US 11,975,353 B2

(45) Date of Patent: May 7, 2024

(54) HEAD PART FOR A CARTRIDGE AND CARTRIDGE

(71) Applicant: Hilti Aktiengesellschaft, Schaan (LI)

(72) Inventor: Thomas Ayrle, Langerringen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/755,691

(22) PCT Filed: Nov. 6, 2020

(86) PCT No.: PCT/EP2020/081264

§ 371 (c)(1),
(2) Date: May 5, 2022

(87) PCT Pub. No.: WO2021/099143

PCT Pub. Date: May 27, 2021

(65) Prior Publication Data

US 2022/0371045 A1 Nov. 24, 2022

(30) Foreign Application Priority Data

Nov. 20, 2019 (EP) .................................... 19210445

(51) Int. Cl.
*B05C 17/01* (2006.01)
*B05C 17/005* (2006.01)
(Continued)

(52) U.S. Cl.
CPC .. *B05C 17/00596* (2013.01); *B05C 17/00503* (2013.01); *B05C 17/0136* (2013.01); *B65D 81/325* (2013.01); *B65D 83/00* (2013.01)

(58) Field of Classification Search
CPC ........ B05C 17/00596; B05C 17/00503; B05C 17/0136; B65D 83/00; B65D 81/325
See application file for complete search history.

(56) References Cited

U.S. PATENT DOCUMENTS 4,690,306 A * 9/1987 Staheli ................ B05C 17/0123 222/137
4,771,919 A * 9/1988 Ernst .................... B65D 81/325 222/506

(Continued)

FOREIGN PATENT DOCUMENTS

DE 3420323 12/1985
DE 29501255 U1 3/1995

OTHER PUBLICATIONS

International Search Report dated Feb. 3, 2021 in PCT/EP2020/081264, with English translation, 5 pages.

(Continued)

*Primary Examiner* — Frederick C Nicolas

(74) *Attorney, Agent, or Firm* — Grüneberg and Myers PLLC

(57) ABSTRACT

A head part for a cartridge is provided for interacting with a dispensing device. The head part has a first receiving region for interacting with a first container and a second receiving region for interacting with a second container. The first receiving region is connected to a first channel and the second receiving region is connected to a second channel which is separated from the first channel at least in regions. A control device is arranged in at least one of the channels for controlling a volume flow of a composition guided through the corresponding channel. A cartridge for a dispensing device has such a head part.

17 Claims, 3 Drawing Sheets

(51) Int. Cl.
*B65D 81/32* (2006.01)
*B65D 83/00* (2006.01)

(56) References Cited

U.S. PATENT DOCUMENTS

| | | | | |
|---|---|---|---|---|
| 4,846,373 | A * | 7/1989 | Penn | B05C 17/00596 222/137 |
| 5,443,182 | A * | 8/1995 | Tanaka | B01F 35/7164 222/137 |
| 5,443,183 | A * | 8/1995 | Jacobsen | B05C 17/00513 222/137 |
| 5,477,987 | A * | 12/1995 | Keller | B05C 17/00513 222/326 |
| 5,566,860 | A * | 10/1996 | Schiltz | B05C 17/00513 222/137 |
| 5,697,524 | A | 12/1997 | Sedlmeier | |
| 5,911,343 | A * | 6/1999 | Keller | B05C 17/00553 222/137 |
| 5,944,226 | A * | 8/1999 | Schiltz | B05C 17/00559 222/326 |
| 6,029,857 | A * | 2/2000 | Keller | B05C 17/00553 222/137 |
| 7,387,681 | B2 * | 6/2008 | Matsunaga | B05B 9/047 118/692 |
| 7,875,001 | B2 * | 1/2011 | Minotti | A61M 15/0003 604/82 |
| 8,365,958 | B2 * | 2/2013 | Ho | B05C 17/00553 222/137 |
| 8,608,030 | B2 * | 12/2013 | Vogt | B05C 17/00553 222/137 |
| 10,287,061 | B2 * | 5/2019 | Dierker | B05C 17/00583 |
| 2002/0000450 | A1 | 1/2002 | Brown et al. | |
| 2006/0021996 | A1 * | 2/2006 | Scott, III | B65D 81/3283 220/717 |
| 2009/0152298 | A1 * | 6/2009 | Woolfson | B01F 35/833 222/145.5 |
| 2014/0305969 | A1 * | 10/2014 | Dittrich | B67D 3/0019 222/135 |
| 2016/0067735 | A1 * | 3/2016 | Bourbeau | B05B 7/26 222/173 |

OTHER PUBLICATIONS

Written Opinion dated Feb. 3, 2021 in PCT/EP2020/081264, with English translation, 7 pages.

* cited by examiner

HEAD PART FOR A CARTRIDGE AND CARTRIDGE

CROSS-REFERENCE TO RELATED APPLICATIONS

This application is the National Stage entry under § 371 of International Application No. PCT/EP2020/081264, filed on Nov. 6, 2020, and which claims the benefit of priority to European Application No. 19210445.3, filed on Nov. 20, 2019. The content of each of these applications is hereby incorporated by reference in its entirety.

BACKGROUND OF THE INVENTION

Field of the Invention

The present invention relates to a head part for a cartridge provided for interacting with a dispensing device, the head part having a first receiving region for interacting with a first container and a second receiving region for interacting with a second container, according to the type defined in more detail as described below. The present invention also relates to a cartridge having such a head part.

Description of Related Art

Cartridges are known from practice which are designed to interact with dispensing devices. Such cartridges have, for example, two chambers in which in particular different materials are stored. For example, there may be a two-component mortar composition in the chambers, a curable resin component being arranged in one chamber and a curing component being arranged in a further chamber that is arranged separately from the first chamber in a reaction-inhibiting manner. Cartridges containing two-component mortar compositions of this kind are used, for example, as injection mortars for the chemical anchoring, for example, of metal elements in mineral substances, in particular structures made of brickwork, concrete or natural stone. In this case, the boreholes which are correspondingly required for fastening the anchoring means are first introduced into the mineral substrate, after which the curable resin component is mixed with the curing component of the two-component mortar composition and introduced into the borehole, whereupon the anchoring means to be fastened is inserted and adjusted, after which the mortar composition is cured.

Known cartridges have a head part on which the two chambers are each arranged in a receiving region. The head part has two channels, one channel being connected to the first chamber and a second channel being connected to the second chamber. The channels are separated from one another in the region of the head part. In order to be able to mix the compositions arranged in the chambers with one another to the desired extent, the head part has a connection region to a mixer which can be connected to the head part. The mixer has a structure for mixing the compositions and an outlet opening for dispensing the mixed composition.

For example, when using compositions in the first chamber and the second chamber which have highly different viscosities or if the pressures present in the chambers are different, there may be an undesired mixing ratio of the components of the compositions at least temporarily, which can lead for example to mixing problems or incomplete curing.

SUMMARY OF THE INVENTION

The object of the invention is that of providing a head part for a cartridge and a cartridge by means of which a desired mixing ratio of the compositions supplied via the receiving regions can be achieved in all states in a simple manner.

The object is achieved by the subject matter as described below. Advantageous embodiments can be found throughout the description.

DETAILED DESCRIPTION OF THE INVENTION

Figure 1:
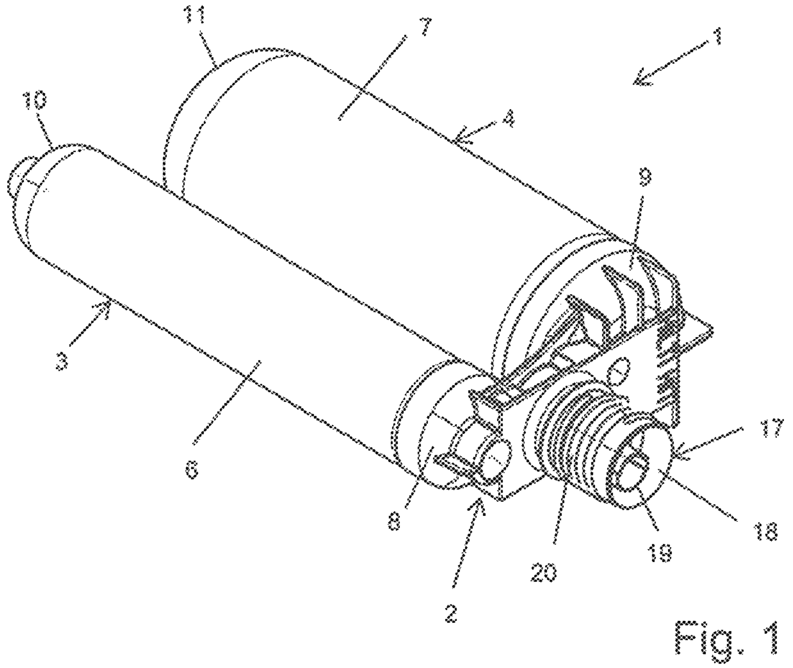
FIG. 1 shows a three-dimensional illustration of a cartridge designed for interacting with a dispensing device, which has two containers each connected to a head part.

A head part for a cartridge provided for interacting with a dispensing device is proposed, the head part having a first receiving region for interacting with a first container and a second receiving region for interacting with a second container, the first receiving region being connected to a first channel and the second receiving region being connected to a second channel which is separated from the first channel at least in regions. According to the invention, a control device is arranged in at least one channel for controlling a volume flow of a composition guided through the corresponding channel.

By means of the control device, in particular an entire volume flow or composition flow supplied to the corresponding channel via the receiving region can be controlled in a structurally simple manner. This can ensure, in a simple manner, a desired mixing ratio of the compositions located in the two containers or chambers in a region fed to a mixer in all operating states and thus reliably prevent the occurrence of mixing problems and/or incomplete curing. In particular if a control device is provided in both channels for controlling the amount of a composition guided through the corresponding channel, in particular a composition flow or a volume flow, the composition flows or volume flows of the individual compositions guided through the channels can be coordinated particularly precisely with one another, such that a desired curing is reliably achieved, for example.

In an advantageous development of a head part according to the invention, the control device is designed to prevent the composition from flowing back into the first container or the second container. This can prevent, in a simple manner, the composition stored in one container from transferring into the other container; in conventional designs, this transfer can occur because, in the installed state of the head part, one composition passes through the mixer into the channel associated with the other container. The solution according to the invention is particularly advantageous when using chemical systems in which a chemical reaction of the components or compositions used continues after initiation even without the further presence of the other component.

In a structurally simple design, the control device can be designed, for example, as a flap which can be displaced in particular between a first state that completely closes the flow cross-section of the channel and a second state that partially, in particular almost completely, releases the flow cross-section of the channel. Here, a spring device, for example, may be provided which applies a force to the flap in the direction of the first state.

In an advantageous development of the head part according to the invention, the control device has a spring device. The spring device is designed such that it releases a volume flow through the corresponding channel when a defined force acts against the spring force of the spring device. The spring device is designed in particular such that it releases a volume flow through the channel only when a defined minimum pressure is applied to the control device upstream of the control device and releases the channel against the defined spring force of the spring device. In this way, an undesired and/or uncontrolled flow of a composition or component from the relevant container can be prevented in a simple manner. In the case of containers made of films, more favorable folding of the film can be achieved as a result, since the minimum pressure that can be set via the control device can ensure that the film rests securely on a wall of the dispensing device.

In a structurally simple design of a head part according to the invention, the control device can be designed as a non-return device, in particular a non-return valve. This can ensure in a simple manner that a composition from a container is only guided through the corresponding channel via the corresponding receiving region if said composition exceeds a defined minimum pressure.

The first channel and/or the second channel preferably have a substantially circular cross-section. As a result, it is possible to arrange a control device in the relevant channel in a simple manner. The channels can have a different diameter from one another. Furthermore, the channels can be arranged coaxially with respect to one another at least in regions.

In an advantageous embodiment of a head part according to the invention, the channel having the control device is separated from the other channel and the corresponding receiving region downstream of the control device, such that the channel having the control device is in operative connection, downstream of the control device, in particular only with the receiving region associated with this channel and is separated from the other channel and the receiving region associated with this channel. In this way, in the installed state of the head part, transfer of a composition located in the first container into the second container and vice versa can be prevented in a simple manner. The first channel and the second channel are preferably separated from one another in the entire head part, the first channel being connected only to the first receiving region and the second channel being connected only to the second receiving region. Contact between the compositions located in the two containers is therefore prevented in the region of the head part.

A cartridge for a dispensing device having a head part (described in more detail above) and at least one first container and a second container is also proposed, the first container having a first chamber for receiving a first composition and the second container having a second chamber for receiving a second composition.

The advantages listed in connection with the head part also apply to a cartridge according to the invention, such that a desired mixing ratio of the compositions of the containers can be reliably achieved with said cartridge in all states.

Both the head part and a mixer which can be brought into operative connection in a conventional manner with the head part are preferably formed from a material to which the compositions intended for use do not adhere. Alternatively or in addition, the head part and/or the mixer can be designed with a coating that fulfills this purpose.

In order to arrange a mixer on the head part, the head part can have a thread by means of which commercially available attachments or dispensing devices for applying the composition located in the cartridge can be attached to the head part precisely in the region of the outlet openings of the channels, thus making it possible to precisely position and dose the composition during application.

Further advantages can be found in the following description of the drawings. An embodiment of the present invention is shown in the drawings. The drawings and the description contain numerous features in combination. A person skilled in the art will expediently also consider the features individually and combine them to form meaningful further combinations.

Figure 2:
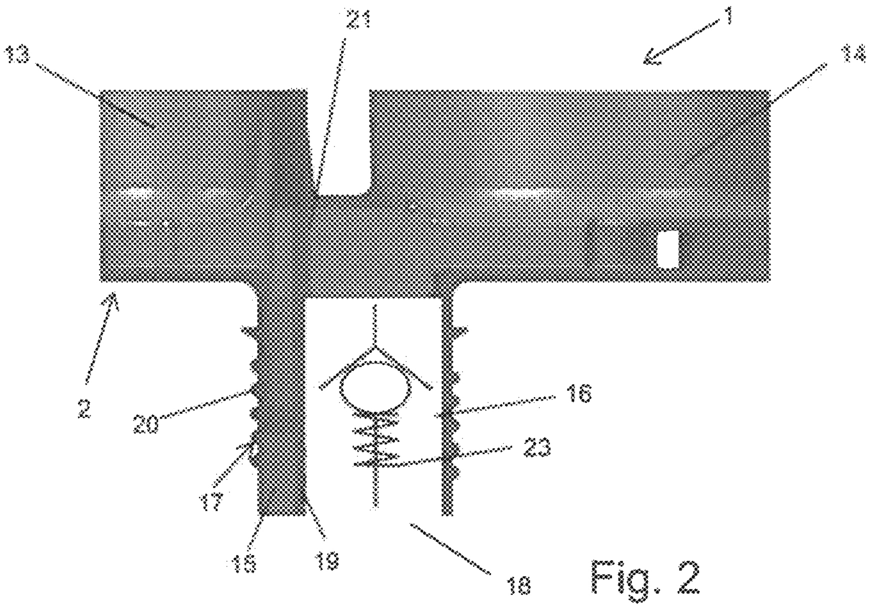
FIG. 2 shows a highly simplified sectional view of a detail of the head part according to FIG. 1 in isolation.
Figure 3:
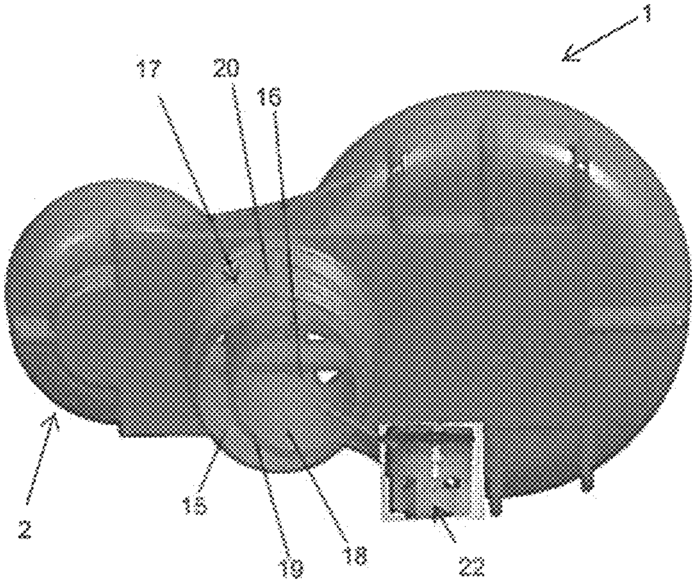
FIG. 3 shows a three-dimensional view of the head part according to FIG. 1 and FIG. 2.

In the drawings, identical and equivalent components are provided with the same reference signs. In the drawings:

FIG. 1 is a three-dimensional illustration of a cartridge designed for interacting with a dispensing device, which has two containers each connected to a head part;

FIG. 2 is a highly simplified sectional view of a detail of the head part according to FIG. 1 in isolation, a control device designed as a non-return valve being arranged in a channel of the head part; and FIG. 3 is a three-dimensional view of the head part according to FIG. 1 and FIG. 2, a non-return valve which can be arranged in a channel of the head part being visible.

Figure 4:
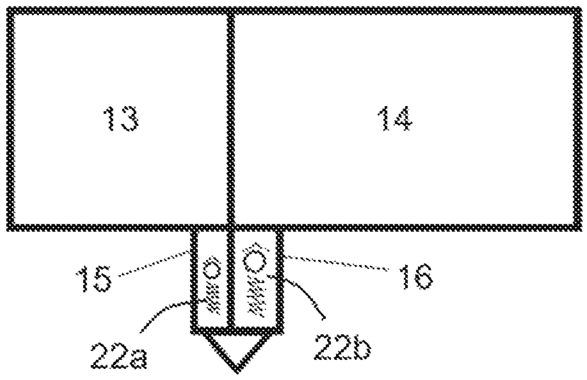
FIG. 4 is a simplified sectional view of a head part, in which a first control device (22*a*) and second control device (22*b*) are arranged in the First and second channels, respectively.

FIG. 4 is a simplified sectional view of a head part, in which a first control device (22*a*) and second control device (22*b*) are arranged in the first and second channels, respectively.

EMBODIMENTS

FIG. 1 shows a cartridge 1 having a head part 2 to which two containers 3, 4 are connected in the present case. The cartridge 1 is designed to interact with a dispensing device by means of which compositions located in the containers 3, 4 can be manually or automatically dispensed to the desired extent.

The cartridge 1 contains, for example, a two-component mortar composition, it being possible for a curable resin component to be arranged in one container 3 of the cartridge 1 and a curing component to be arranged in the other chamber 4 that is arranged separately from the first chamber in a reaction-inhibiting manner. The composition produced after mixing the curable resin component and the curing component is used, for example, as an injection mortar for the chemical anchoring, for example, of metal elements in mineral substances, in particular structures made of brickwork, concrete or natural stone. In this case, the boreholes which are correspondingly required for fastening the anchoring means are first introduced into the mineral substrate, after which the curable resin component is mixed with the curing component of the two-component mortar composition and introduced into the borehole, whereupon the anchoring means to be fastened is inserted and adjusted, and the mortar composition is subsequently cured.

The compositions are each arranged in chambers of the containers 3, 4, the containers 3, 4 in the present case each having a substantially cylindrical base body 6 and 7, respectively, with a first end wall 8 and 9, respectively, and an opposite second end wall 10 and 11, respectively. The first end wall 8 or 9 has a dispensing opening or a region provided for releasing the composition located in the relevant container 3 or 4. In the present case, the containers 3, 4 are designed as containers 3, 4 made at least partially, in particular almost completely, of films; in an alternative embodiment, they can also be designed as so-called hard cartridges or the like.

In the present case, the head part 2 has a first receiving region 13 and a second receiving region 14 spaced apart from one another, the first receiving region 13 being provided for connecting the first container 3 to the head part 2 and the second receiving region 14 being provided for connecting the second container 4 to the head part 2. In the embodiment shown, the receiving regions 13 and 14 are arranged without a direct connection to one another.

In an alternative embodiment, it may also be the case that one container of the cartridge is arranged within the other container of the cartridge. The cartridge can be attached to the head part together with both containers, the head part in turn having a first receiving region associated with the first container and a second receiving region associated with the second container. One receiving region is encompassed by the other receiving region, the receiving regions being separated from one another such that the relevant receiving region is exclusively in contact with the associated container and thus with the material stored in the relevant container.

A channel 15 or 16 is associated with both the first receiving region 13 and the second receiving region 14, the first channel 15 being connected to the first receiving region 13 and not being in contact with the second receiving region 14. The second channel 16 is connected to the second receiving region 14 and accordingly has no contact with the first receiving region 13. This ensures in the present embodiment that the compositions located in the containers 3, 4 cannot come into contact with one another before they exit an outlet opening 18 of the head part 2.

The head part 2 has a substantially tubular outlet nozzle 17 having a substantially circular cross-section. The channels 15, 16 are arranged in the outlet nozzle 17, the channels 15, 16 extending separately from one another within the outlet nozzle 17. In the present case, the second channel 16 has a circular cross-section and the first channel 15 has a substantially crescent-shaped cross-section, the first channel 15 being separated from the second channel 16 by a wall 19. However, in principle the shape of the cross-sections of the channels 15, 16 can be selected as desired.

The outlet nozzle 17 thus has the two channels 15 and 16 which are in fluid connection with the respective receiving regions 13 and 14 and are separated from one another by the wall 19. The wall 19 extends from a connecting piece 21 separating the receiving regions 13 and 14 up to the outlet opening 18 of the head part 2.

The head part 2 is made in particular from a material to which the compositions stored in the containers do not adhere. Alternatively, the head part 2 can have a non-stick coating, particularly in the regions that interact with the compositions, such as the channels 15, 16.

A connection region 19 for a conventionally designed static mixer (not shown in detail) is arranged on an outer periphery of the outlet nozzle 17 or outlet pipe. In the present case, the connection region 19 is designed as a thread, such that a mixer can be arranged on the head part 2 in a screwing movement. Such a mixer has a structure which leads to the most favorable possible mixing of the compositions guided via the channels 15, 16. Due to the structure of the mixer, the compositions, which are guided via the channels 15, 16 and come from the containers 3, 4, come into contact with one another for the first time in the direction of flow.

For example, in the case of compositions in the containers 3, 4 having highly different viscosities and/or when there are pressure differences in the containers 3, 4, undesired deviating volume flows of one or both compositions can occur. This may cause a composition to pass through the static mixer into the unassociated channel 15 or 16 and possibly into the corresponding other container 3 or 4. This can have undesirable effects, such that, for example, there is cured material in a channel 15 or 16. Furthermore, there may be a mixing problem, incomplete curing or curing in a container 3 or 4. The last-mentioned situation is particularly relevant in chemical systems in which a chemical reaction of the compositions continues after initiation even without the further presence of a composition.

In order to prevent the compositions stored in the containers from coming into contact with one another in an undesired manner in the region of the head part 2 or in the containers 3, 4, a control device 22 designed here as a non-return valve is arranged in the second channel 16. The non-return valve 22 reliably prevents the composition located in the container 3 and conveyed through the outlet opening 18 via the first channel 15 from being guided upstream through the non-return valve 22. The composition located in the container 3 is thus reliably prevented from reaching the second container 4.

The non-return valve 22 is shown schematically in FIG. 2 and in a simplified manner in an unmounted state in FIG. 3. The non-return valve 22 has a spring device 23 which closes the second channel 16 without applying an external force. The non-return valve 22 releases a volume flow through the second channel 16 only when an external force applied to the non-return valve 22 on the container side exceeds the spring force of the spring device 23. The composition stored in the container 4 can thus be guided through the second channel 16 in the direction of the outlet opening 18 of the head part 2 only when a defined minimum pressure present in the second container 4 is exceeded. This is particularly advantageous when using film containers, since it ensures that the container rests against a wall of a dispensing device to the desired extent and that the film container is folded as well as desired during a dispensing process.

The non-return valve 22 can also reliably prevent an undesired and/or uncontrolled flow of the composition from the container 4 and an inflow of the composition of the first container 3 into the second container 4 and thus the occurrence of a reaction of the compositions in the second container 4.

As an alternative to the use of a non-return valve 22, a spring-loaded flap, for example, can also be provided, which allows the composition to flow out of the second container 4 in the direction of the outlet opening 18 and prevents a composition from flowing in the direction of the second container 4 and thus prevents backflow in the direction of the second container 4.

Furthermore, such a control device may be likewise arranged in the first channel 15 in order, for example, to also reliably prevent the composition from flowing back into the first container 3.

The invention claimed is:

1. A head part for a cartridge provided for interacting with a dispensing device, the head part comprising:

a first receiving region for interacting with a first container, and a second receiving region for interacting with a second container, the first receiving region being connected to a first channel and the second receiving region being connected to a second channel which is separated from the first channel at least in a region, wherein a control device is arranged in the first channel for controlling a volume flow of a composition guided through the first channel, and wherein a control device is not arranged in the second channel.

2. The head part according to claim 1, wherein the control device is designed to prevent the composition from flowing back into the first container.

3. The head part according to claim 1, wherein the control device has a spring device.

4. The head part according to claim 3, wherein the control device is designed as a non-return device.

5. The head part according to claim 1, wherein the first channel and/or the second channel has a substantially circular cross-section.

6. The head part according to claim 1, wherein the first channel the second channel and the second receiving region downstream of the control device.

7. A cartridge for a dispensing device, having:

the head part according to claim 1, the first container, and the second container, wherein the first container has a first chamber for receiving a first composition and the second container has a second chamber for receiving a second composition.

8. The head part according to claim 4, wherein the non-return device is a non-return valve.

9. A head part for a cartridge provided for interacting with a dispensing device, the head part comprising:

a first receiving region for interacting with a first container, and a second receiving region for interacting with a second container, the first receiving region being connected to a first channel and the second receiving region being connected to a second channel which is separated from the first channel at least in a region, wherein a first control device is arranged in the first channel and is configured for dispensing a first composition at a first pressure, and wherein a second control device is arranged in the second channel and is configured for dispensing a second composition different from the first composition at a second pressure different from the first pressure.

10. The head part according to claim 9, wherein the first control device is designed to prevent the first composition from flowing back into the first container and the second control device is designed to prevent the second composition from flowing back into the second container.

11. The head part according to claim 9, wherein the first control device has a spring device and/or wherein the second control device has a spring device.

12. The head part according to claim 11, wherein the first control device is designed as a non-return device and/or wherein the second control device is designed as a non-return device.

13. The head part according to claim 9, wherein the first channel and/or the second channel has a substantially circular cross-section.

14. The head part according to claim 9, wherein the first channel is separated from the second channel and the second receiving region downstream of the first control device, and wherein the second channel is separated from the first channel and the first receiving region downstream of the second control device.

15. A cartridge for a dispensing device, having:

the head part according to claim 9, the first container, and the second container, wherein the first container has a first chamber for receiving the first composition and the second container has a second chamber for receiving the second composition.

16. The head part according to claim 12, wherein the first control device is designed as a non-return valve and/or wherein the second control device is designed as a non-return valve.

17. The head part according to claim 9, wherein the first control device is configured for dispensing the first composition having a first viscosity, and wherein the second control device is configured for dispensing the second composition having a second viscosity different from the first viscosity.

* * * * *